United States Patent Office 3,384,972
Patented May 28, 1968

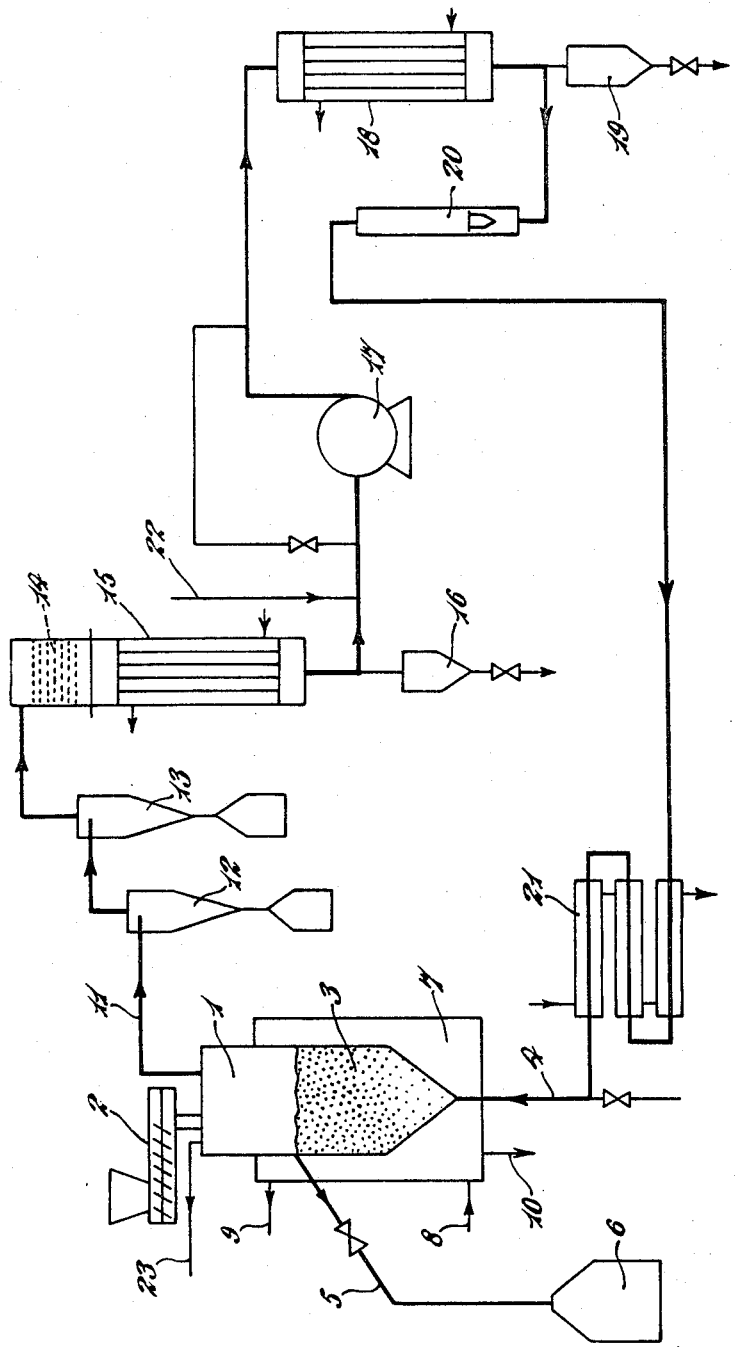

3,384,972
TREATMENT OF LEAD SLUDGES
Geoffrey R. Oxley, Meswall, Wirral, England, assignor to The Associated Octel Company Limited, London, England
Filed Mar. 9, 1966, Ser. No. 533,056
Claims priority, application Great Britain, Mar. 19, 1965, 11,780/65
10 Claims. (Cl. 34—9)

ABSTRACT OF THE DISCLOSURE

Lead sludge resulting from the manufacture of lead alkyls is dried by feeding the moist sludge directly to a bed of particulate material maintained in a fluidised state by a gas stream of a fluidising gas at a temperature of at least 30° C.

---

This invention relates to the treatment of lead sludges resulting from the manufacture of lead alkyls.

Lead alkyls, particularly tetraethyl lead, are manufactured in large quantities by the reaction of finely divided lead-sodium alloy with an alkylating agent, for example, ethyl chloride. Usually the reaction is carried out in an autoclave although continuous processes have recently been proposed. One of the products of these processes is a dense lead sludge, the exact composition of which will, of course, vary from process to process. Generally, however, where the product tetraalkyl lead has been stripped from the reaction mass by steam distillation, the sludge will contain a large amount of unreacted finely divided lead, sodium chloride, a quantity of lead tetraalkyl, and water.

In order to operate the process upon an economic basis it is necessary to treat the product sludge to recover the lead and also the unextracted lead tetraalkyl. The treatment of the sludge poses many problems, not the least of which are the quantity of sludge which has to be treated, the bulk density of the sludge, which may range from 1 to 5 or more, the health risks involved from the fine lead powder and the lead tetraalkyl, and a very marked tendency to cake.

Very many processes have been proposed for the treatment of these sludges, both by physical means and chemical means.

In a commonly used procedure the sludge discharged from the steam distillation kettle is fed into a sludge pit. In the pit an aqueous brine layer separates and can be drained off while the lead sludge settles to the bottom of the pit. The sludge is removed from the pit and fed into a drier from which some of the lead tetraalkyl is recovered. The dried sludge is finally smelted to recover the lead.

For the purpose of drying the sludge many methods have been proposed ranging from presses which squeeze the moisture out under high pressure and simultaneously pellet the sludge ready for feeding to the smelting furnace, to steam jacketed drying vessels in which the sludge is mechanically agitated while being heated. In this latter type of equipment, which is commonly used, many operational difficulties arise and considerable mechanical maintenance is necessary. The agitator has a tendency to seize resulting from compaction of the sludge between the agitator arms and the casing. Further, the agitator has to be removed periodically and caked sludge chipped by hammer and chiesel from off the agitator arms. While methods employing presses are not so subject to the adverse effects of caking, the presses are nevertheless expensive to operate and relatively inefficient since only the aqueous phase is expelled in the pelleting process and the pellet must be broken up if it is required to recover the lead tetraalkyl content.

The drying of lead sludges resulting from lead alkyl manufacture is thus a longstanding and continuing problem and there is a need for an efficient, simple and inexpensive method of performing this operation.

In accordance with the present invention it has been found, contrary to all expectation, that these lead sludges may be rapidly and efficiently dried by means of a fluidised bed technique. In particular it has been found that once a fluidised bed of hot dry sludge particles has been achieved the incoming wet sludge rapidly disintegrates upon reaching the bed and does not show any tendency to cake. Indeed the dried lead sludge is recovered from the fluidised bed in the highly convenient form of substantially moisture-free granules which are suitable for feeding to the smelting furnace without further processing. The reason for the rapid distintegration of the incoming sludge and the absence of any substantial problem of caking is not fully understood, but is probably due to very rapid evaporation of moisture from the incoming sludge upon contact with the bed, this rapid evaporation itself serving to break up the sludge and prevent caking, but it is also probably due, in part at least, to mechanical disintegration of the incoming sludge by physical contact with the already dried or partially dried particles in the bed.

Not only is the fluidised bed drying techniques found to be advantageous from the point of view of lack of caking and break up of the sludge into granular form, but it is also found that an extremely high heat transfer efficiency can be maintained within the bed and that the bed can be kept fluidised with a surprisingly low pressure drop across the bed, particularly having regard to the high density of the lead sludge particles. Thus, it is found that the drying process can be operated with desirably low power costs.

In accordance with this invention, therefore, there is provided a method of drying lead sludges resulting from the manufacture of lead alkyls, particularly lead tetraethyl, which comprises feeding the moist lead sludge to a fluidised bed of particulate solid material maintained in a fluidised state by means of a stream of a fluidising gas non-reactive with said lead or any lead alkyl which may be present in the lead sludge and at a temperature of at least 30° C. but not exceeding the melting point of the lead sludge fed thereto, and recovering from the fluidised bed dried lead sludge in granular form substantially free of moisture. The fluidised bed is desirably operated on a continuous basis with the wet sludge being fed under gravity and in a substantially continuous stream to the bed from, for example, a screw conveyor, while a substantially continuous stream of dried lead particles is taken from the bed, for example, by means of an overflow from the upper surface of the bed. The fluidising gas, preferably nitrogen, is preferably preheated before feeding to the fluidisation vessel. Generally the fluidising gas will be preheated to a temperature of about 100° C., or possibly higher, but preferably not so high as to cause decomposition of uncondensed lead alkyl vapour recycled with the fluidising gas.

The fluidising gas will be fed to the bottom of the fluidised bed vessel in a conventional manner through a non-return valve. Depending upon the depth of the bed it may or may not be desirable to use a gas distribution plate. While, generally, a gas distribution plate is desirable to ensure an even distribution of gas flow through the bed, it is found that for relatively shallow beds the use of a flat distribution plate can be disadvantageous in that there may be some tendency for the plate to become blocked by lead sludge particles which may not have lost all their moisture before reaching the bottom of the bed. In such a case, therefore, it may be desirable to dispense with a distribution plate, or, at least, to use a conical plate rather than a flat one. Where a relatively deep bed is used, i.e. having a depth substantially equal to its breadth, the problem of clogging is not so apparent and a flat distribution plate may then be used with advantage.

The main heat is supplied to the fluidised bed for example by means of a heating jacket around the vessel at the height of the bed. This may be an electrically heated jacket, a steam jacket, a vapour condensation jacket, e.g. employing heated diphenyl, or heated directly by means of oil or gas burners. Alternatively, heat exchangers may be provided inside the bed itself. The temperature in the fluidised bed is maintained at at least 30° C. The only upper limit is imposed by the melting point of the lead particles themselves, but for the best results temperatures in the range 79–100° C. are used.

The fluidisation gas is taken off from the upper part of the vessel and passed through a filter system to remove entrained fines and then a cooling system wherein the water and residual lead tetraalkyl are condensed. The gas is thereafter recompressed, reheated and recirculated.

The fluidising velocity for the nitrogen gas ranges from 0.15 ft. per second to 1.0 ft. per second, preferably about 0.4 ft. per second. Too high a fluidising gas velocity results in too high a proportion of fine material being carried over in the exit gas stream. As stated the process can be operated with a desirably low pressure drop across the bed, for example, of the order of 2 lbs. per square inch per foot depth of bed.

The throughput of the equipment will, of course, be dependent upon the heat input to the bed and both will be balanced so that the temperature stays within the stated range. It will be apparent that the temperature of the bed will be determined by several factors, for example, the feed rate of sludge, the feed and temperature of the fluidising gas and the temperature of the heating means supplying heat direct to the bed. These factors will be balanced one against the other to maintain the desired temperature of the bed. The temperature of the fluidised bed will be substantially uniform, this being one of the well-established features of fluidised systems.

The process of the invention is applicable to lead sludges derived from any lead alkylation process and which contain lead in finely divided form and moisture. The wet sludge may have a bulk density of from 1 to 5, usually about 4. The initial moisture content of the lead sludge will vary considerably depending on the lead alkyl manufacturing and recovery processes used. However, typical initial moisture contents of lead sludges which can be processed in accordance with this invention range from 9 to 17% water and from 0.5 to 8% lead alkyl.

The process of the invention achieves highly effective drying, the average moisture content of dried sludge leaving the bed being 0.05% or lower at bed temperatures of about 90° C. or about 0.3% at bed temperatures of about 50° C. The process provides an extremely efficient recovery rate for lead tetraalkyl, this being of the order of 100% recovery.

Furthermore, the technique embodies all the advantages associated with fluidisation processes, such as the absence of moving parts, glands, etc., high rates of heat transfer, uniform product and simplicity of operation.

These advantages in turn lead to a reduction in the health hazard associated with the commonly used technique by virtue of the absence of glands and the reduction of maintenance work on highly contaminated components.

When starting up a drying process according to the invention, it will, of course be necessary to establish a fluidised bed of particulate material at the desired temperature before commencing the feed of lead sludge. Since the resulting product of the invention is a substantially moisture-free granular product consisting of lead, a suitable particulate material for establishing a fluidised bed at the commencement of the drying process is lead powder, or dried sludge particles from a previous run. However, other particulate material such as sand may be used to establish the bed although this is less preferred because of subsequent separation problems.

A plant for carrying out the process of this invention is illustrated diagrammatically in the accompanying drawing.

Referring to the drawing, the moist lead sludge is fed substantially continuously to a fluidised bed vessel 1 by means of a screw conveyor 2. A bed 3 of lead sludge particles is maintained in a fluidised state in the vessel 1 by means of a stream of nitrogen gas fed through line 4. A substantially continuous stream of dried lead sludge granules is withdrawn from the upper surface of the bed 3 by means of an overflow tube 5 leading to a collection vessel 6.

The vessel 1 is enclosed in a vapour jacket 7 to which a heated vapour, e.g. diphenyl vapour, is circulated through lines 8 and 9, with condensed liquid being withdrawn through line 10.

From the vessel 1, the fluidising nitrogen gas stream is taken via line 11 through two cyclone separators 12 and 13 and a filter 14 to a water cooled condenser 15. Fines recovered from the gas stream by the cyclones may be combined with the dried sludge product in collection vessel 6 or may be recirculated to the fluidised bed.

In the condenser 15 lead alkyl and water are condensed and collected in the receiver 16. From the condensate collected in receiver 16 lead alkyl separates to the bottom and may be run off.

The nitrogen gas stream from the condenser 15 is now compressed by a compresser 17 and passed through a second water cooled condenser 18 from which a further lead alkyl/water stream is collected in receiver 19.

The nitrogen gas is now passed through a rotameter 20 and a preheater 21, through which steam is circulated, and recirculated to the fluidisation vessel.

To maintain a circulating stream of nitrogen a nitrogen bleed is fed to the system, for example, through line 22 and a nitrogen bleed taken from the fluidising vessel through line 23.

Using a plant substantially as illustrated in the accompanying drawings but only on a laboratory scale the following results were achieved using a 9" diameter fluidised bed vessel with a fluidised bed of 16" in depth.

| | |
|---|---|
| Lead sludge feed rate | 200–250 lbs./hr. |
| Lead sludge moisture content | 9.8% by weight. |
| Lead sludge tetraethyl lead content | 7.2% by weight. |
| Vapour jacket temperature | 190° C. |
| Fluidised bed temperature | 80–100° C. |
| Nitrogen gas velocity | 0.3.–0.4 ft./sec. |
| Nitrogen gas temperature | 100° C. |

Product recovery (dried sludge granules):

| | |
|---|---|
| Water content | 0.05% by weight. |
| Tetraethyl lead content | <0.1% by weight. |
| Tetraethyl lead recovery | 98.6% purity; >99.9%. |

Clearly many modifications may be made in the plant and process described above, particularly when intended for use on a commercial scale, where, in particular, heating means for the fluidising vessel other than a vapour jacket will be used, for example, an electrically heated jacket or internal heating elements in the fluidised bed itself, but such modifications will be within reach of persons skilled in the art without departing from the scope of the invention as defined in the appended claims.

I claim:

1. A method of drying lead sludges resulting from the manufacture of lead alkyls, particularly lead tetraethyl, which comprises the steps of:
   (i) feeding the moist lead sludge to a bed of particulate solid material,
   (ii) maintaining said particulate solid material in a fluidised state by means of a stream of a fluidising gas non-reactive with said lead or any lead alkyl which may be present in the lead sludge, (iii) maintaining the bed of particles at a temperature of at least 30° C. but not exceeding the melting point of the lead sludge fed thereto, and (iv) recovering from the fluidised bed dried lead sludge in granular form substantially free of moisture.

2. A method according to claim 1, in which the fluidised bed is a bed of dried lead sludge particles and the lead sludge is fed thereto substantially continuously while a substantially continuous stream of dried lead sludge particles is withdrawn therefrom.

3. A method according to claim 2, in which the fluidised bed is maintained at a temperature in the range 70 to 100° C.

4. A method according to claim 3, in which the fluidising gas is nitrogen.

5. A method according to claim 4, in which the fluidising gas velocity is from 0.15 to 1.0 ft. per second.

6. A method according to claim 1, which comprises the steps of:
(i) feeding the moist lead sludge substantially continuously to a bed of dried lead sludge particles,
(ii) maintaining said particles in a fluidised state by a stream of fluidising gas non-reactive with said lead and any lead alkyl which may be present in the sludges,
(iii) maintaining said bed of particles at a temperature of at least 30° C. but not exceeding the melting point of the lead sludge particles,
(iv) withdrawing substantially continuously from said bed a stream of dried lead sludge particles substantially free of moisture,
(v) withdrawing an exit stream of the fluidising gas, and
(vi) recovering from the exit stream of fluidising gas lead alkyl carried over from the fluidised bed by the fluidising gas.

7. A method according to claim 6, in which the lead sludge is fed under gravity to the fluidised bed and the dried lead sludge particles are removed by overspill from the surface of the bed.

8. A method according to claim 6, in which the bed is maintained at a temperature in the range 70 to 100° C.

9. A method according to claim 8, in which the fluidising gas is nitrogen.

10. A method according to claim 9, in which the fluidising gas velocity is about 0.4 ft. per second.

References Cited

UNITED STATES PATENTS 2,394,651  2/1946  Alther _____ 34—10 X
2,574,759  11/1951  Rodenkohr et al. _____ 260—437

FREDERICK L. MATTESON, Jr., *Primary Examiner.*

J. J. CAMBY, *Assistant Examiner.*